March 23, 1965 R. M. WOLFE 3,175,185

CONTROLLABLE MAGNETIC STORAGE UNIT

Filed May 21, 1962 3 Sheets-Sheet 1

INVENTOR
R. M. WOLFE
BY
Charles Scott Phelan
ATTORNEY

March 23, 1965 R. M. WOLFE 3,175,185

CONTROLLABLE MAGNETIC STORAGE UNIT

Filed May 21, 1962 3 Sheets-Sheet 2

INVENTOR
R. M. WOLFE
BY
Charles Scott Phelan
ATTORNEY

INVENTOR
R. M. WOLFE
BY
Charles Scott Phelan
ATTORNEY 3,175,185

CONTROLLABLE MAGNETIC STORAGE UNIT

Robert M. Wolfe, Colonia, N.J., assignor to Bell Telephone Laboratories, Incorporated, New York, N.Y., a corporation of New York Filed May 21, 1962, Ser. No. 196,052
21 Claims. (Cl. 340—174)

This invention relates to a controllable information storage unit. More particularly, it relates to such a unit which is useful in information processing systems such as all-magnetic shift registers wherein information is stored in magnetic devices which are interconnected, at least in part, by electric circuits that include wire only.

It is well known that magnetic devices may be used for switching elements and for storing information bits in a binary system of representation. The devices usually include material having a rectangular hysteresis loop defining two stable conditions of magnetic flux remanence between which the devices may be switched by the application of an appropriately oriented magnetic field. One of the stable conditions may represent a binary ONE and the other a binary ZERO. Magnetic devices that are used for switching and storage have a number of advantages over electric current conducting devices for switching and storage since the magnetic elements suffer no substantial leakage of stored signal and are for most practical purposes unaffected by aging or environmental conditions. Accordingly, it is advantageous in many signal handling apparatus arrangements to use magnetic devices instead of electric current conducting devices.

A shift register is a typical information handling system that is often used as a basic building block for larger and more complex information handling systems. The present invention is, therefore, hereinafter considered with respect to its application to a shift register. This application is, however, by way of illustration only and is not in any way intended to be a limitation on the potential applications of the invention.

Typical all-magnetic shift registers, and the logical elements which they employ, have relatively slow operating speeds when considered in terms of present day electronic systems. Thus, at the present time the best known all-magnetic shift registers can, on occasion, achieve operating speeds as high as 200 kilocycles per second, i.e., they can accommodate incoming information at the rate of 200,000 bits per second in a binary signal system. No known commercially available all-magnetic shift registers operate significantly higher than such speed. A principal reason for the speed limitation is that known shift register circuits are so arranged that shift signal amplitudes must be limited to prevent erroneous operation of the magnetic devices. Another significant reason for speed limitation in prior art circuits is that as the frequency of operation increases conventional magnetic devices are unable to dissipate sufficient heat to prevent a major increase in temperature with resulting change in magnetic characteristics.

Present day all-magnetic shift registers also usually incorporate some form of unidirectional, non-storing, gain stages, such as a step-up transformer or a pulse amplifier. Consequently, these shift registers cannot be readily reversed; and they also encounter significant problems whenever it is attempted to produce fan-in, driving two or more circuits in multiple into a single circuit, or fan-out, utilizing the output of a single circuit to drive two or more circuits.

It is, therefore, one object of the invention to increase the operating speel of all-magnetic logic circuits.

An additional object is to operate all-magnetic logic circuits at significantly higher speeds than were heretofore possible with any given amount of fan-out.

Another object is to increase the flexibility of all-magnetic logic circuits.

A further object is to improve all-magnetic shift registers by increasing their operating speed and their flexibility.

These and other objects of the invention are realized in an illustrative embodiment wherein anisotropic magnetic elements are employed in a lattice type of controllable information storage network such as that shown in the copending application of G. W. Dick, Serial No. 196,214, entitled "Controllable Magnetic Storage Circuit," which was filed on the same day as the present application and assigned to the same assignee. Shift, or drive, circuits are coupled to the elements for controlling the storage of signals in the network.

The anisotropic magnetic elements are characterized by an unstable hard direction of magnetization and a substantially perpendicular, stable, easy direction of magnetization into which each element relaxes upon the removal of an applied magnetic field in the hard direction. Signals generated in an electric circuit coupled to such an element when the element is driven from the easy to the hard direction of magnetization are utilized as tipping signals for driving another such element to a predetermined polarity of easy magnetization upon the relaxation of such other element. Those generated signals may also be used to actuate dissimilar external circuits. This improvement in the Dick lattice network preserves all the features of that network and also generates additional unexpected features.

It is one feature of the invention that information is stored in, or read out of, a controllable storage unit by shifting the magnetization condition of an anisotropic magnetic element back and forth between the hard and easy directions of magnetization, a process involving the rotation of magnetic domains within the material rather than the expansion of domain walls. This particular operation mode permits switches between the hard and easy directions of magnetization to take place at a much higher speed than is usually possible for transfers of an ordinary bistable magnetic element from either one of its stable magnetic remanent conditions to the other.

It is another feature of the invention that the large voltage which is generated when one anisotropic element is driven from its easy to its hard direction of magnetization is utilized to supply the relatively small tipping current required by another anisotropic element that is relaxing so that it is not necessary to employ an intermediate, non-storing, gain-generating stage between storage stages in a system.

It is a further feature of the invention that the large magnetomotive force required to switch an anisotropic magnetic element from one polarity to the other in its easy direction of magnetization, and the return current splitting which is inherent in the Dick lattice network, practically eliminate the danger of spurious switching of magnetic elements and thereby eliminate the need for bias circuits in the storage network.

Another feature of the invention is that since positive action is required in the storage circuit to set a magnetic element to either polarity of easy magnetization for storing either a binary ONE or a binary ZERO, it is difficult for noise-injected errors to occur.

A further feature is that there is no need for strict amplitude control of signals utilized to generate fields for changing an anisotropic magnetic element to its hard direction of magnetization because such an element is always subjected to a tipping signal upon relaxation of the hard field. Furthermore, the magnetomotive force which is used to hold such an element in its hard direction of magnetization is usually of such large magnitude that any tipping signals to which it may be incidentally exposed have no effect thereon and accordingly no special bias is required to prevent spurious operation.

Another outstanding feature of the invention is that the absence of unidirectional gain devices permits easy reversal of information flow through the circuit of the invention by merely switching shift circuit connections. In addition, the shift circuits may be readily modified by automatic or manual switching techniques in order to make the circuit perform different functions. Among such functions, two, which will be hereinafter illustrated, are parallel non-destructive readout, and information complementing during shift.

The aforementioned objects and features of the invention, as well as others, may be better understood upon a consideration of the following detailed description together with the appended claims and the attached drawings in which:

Figure 1:
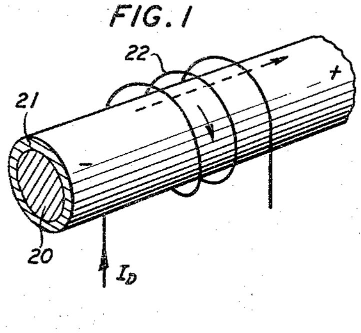
FIGS. 1 and 2 illustrate one form of an anisotropic magnetic storage element that may be used in the invention.

In FIG. 1 a convenient form for an electromagnetic storage element that may be used in the invention is shown. It comprises a segment of wire having an electrically conductive core 20 which may, for example, be a copper wire. Around at least a portion of the core 20 is a coating 21 of anisotropic magnetic material. Such material typically displays substantially rectangular hysteresis characteristic in the easy direction of magnetization, and this characteristic defines two stable remanent flux conditions. The material also is characterized by a hard direction of magnetization to which it may be shifted upon application of an appropriately oriented magnetic field of sufficient field strength. Upon removal of such field the device relaxes into one polarity of its easy direction of magnetization under the influence of a small bias force.

In the illustrative example to be described herein it has been assumed that the material 21 has its easy direction of magnetization circumferentially oriented with respect to core 20 and has its hard direction of magnetization along the length of the wire core 20. A solenoid winding 22 is provided around a portion of the coating material 21, and a drive current $I_D$ may be applied to the winding 22 for generating an axial magnetic field to drive the material 21 into its hard direction of magnetization. It is understood at the present time that changes between the easy and hard direction of magnetization take place by the rotation of magnetic domains in the material 21, whereas transfers between stable conditions of rectangular-loop magnetic material normally take place by nucleation of a magnetic domain followed by the expansion of the domain walls. The differences between these two processes for shifting magnetization involve a difference in speed of operation which is quite significant and a significant difference in the amount of energy dissipated. Rotation of domains is favored on both counts because it is faster and requires a relativity insignificant energy dissipation.

One magnetic element of the type shown in FIG. 1 had a beryllium copper core 0.005 inch in diameter plated with a one-micron layer of Permalloy material having a composition of 81 percent nickel and 19 percent iron. This element was plated in the presence of a circumferential magnetic field so that it displayed circumferential easy magnetization. A 50-turn solenoid with an axial length of about 0.15 inch was employed on the element.

In FIG. 1 it has been assumed that the coating material 21 is magnetized in the clockwise direction around wire core 20 in its easy direction of magnetization. The flow of current $I_D$ to winding 22 generates a magnetic field axially along the element from left to right as indicated by the broken-line arrow thereon. This field rotates magnetic domains in the material 21 into alignment with the broken arrow and induces a voltage in wire core 20 with the polarity indicated by signs on the element. The resulting current in wire core 20 flows from the minus sign to the plus sign.

Figure 2:
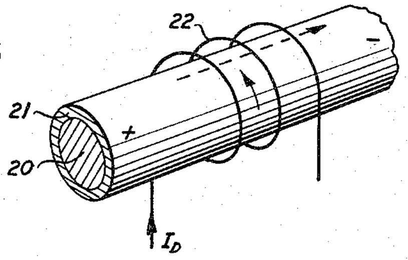

A similar storage element is illustrated in FIG. 2, but in this case it is assumed that the easy direction of magnetization is in the counterclockwise direction with respect to wire core 20. Now the application of current $I_D$ to winding 22 shifts the magnetization to the hard direction in alignment with the broken arrow as before, but in this case the induced voltage in wire core 20 is in the reverse direction as illustrated in the drawing by the polarity signs on the element.

The polarity with which drive current $I_D$ is applied is of little significance insofar as the induced voltage across a segment of wire core 20 is concerned since such voltage always tends to produce a current which generates a magnetic field that would restore magnetization domains to the easy direction of magnetization with the previous polarity. Since the hard and easy magnetization directions are perpendicular to one another the induced voltage across wire core 20 is independent of the polarity of the drive current $I_D$. Accordingly, in subsequent schematic representations storage elements such as those illustrated in FIGS. 1 and 2 comprise a coil with an axial line therethrough. An initial condition of easy magnetization may be indicated by polarity signs adjacent to the coil terminals indicating the direction of the induced voltage in the conductive core thereof upon application of drive current $I_D$. In other words, when polarity signs are shown they are evidence of an initial direction of easy magnetization as well as indicating the direction of the resulting core current when the element is driven into its hard direction of magnetization.

Figure 3:
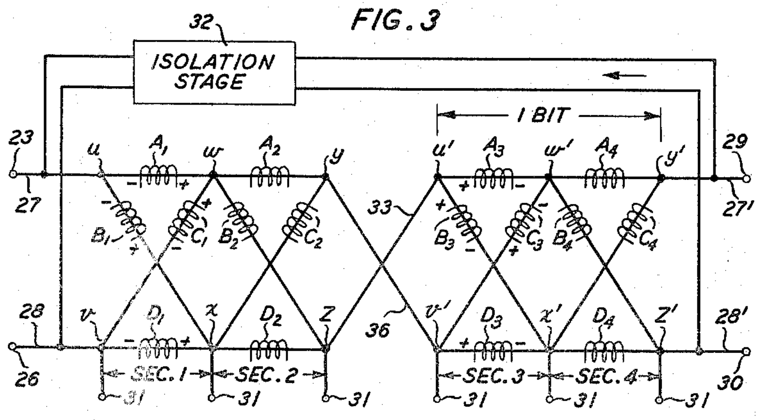
FIG. 3 is a schematic diagram of a lattice type of shift register utilizing the invention.

FIG. 3 illustrates an all-magnetic shift register utilizing a controllable magnetic storage unit in accordance with the invention. Such a unit comprises a plurality of wires arranged in a lattice network and engaging magnetic devices in the manner disclosed in the aforementioned G. W. Dick application. Four lattice sections are illustrated in FIG. 3, and it is shown therein that two such sections are operated together to comprise a shift register stage for one bit of information. It will be assumed throughout the description of FIG. 3 and related figures that the invention is utilized in connection with a binary representation system wherein the presence of a binary ONE is indicated by a first polarity of easy magnetization. The presence of a binary ZERO is indicated by a second polarity of easy magnetization. Different permutations of ONES and ZEROS represent the various characters of intelligible text.

Each lattice section of the register is a wire network arranged in a bridge circuit with a magnetic storage device electromagnetically engaging the wire in each arm of the bridge. Network input terminals are at the terminals of one bridge diagonal, and the network output terminals are at the terminals of the other bridge diagonal. Each bridge arm with its associated magnetic storage device and solenoid winding comprises a storage element of the type shown in FIG. 1.

The storage elements with their anisotropic magnetic coatings are arranged in a first combination of wire pairs A, B and C, D with the elements of each pair connected in multiple to a different one of the lattice input terminals. These same storage elements are also arranged in a different combination of wire pairs A, C and B, D, with the elements of each pair connected in multiple to a different one of the lattice output terminals. Subscripts 1 through 4 are utilized in connection with the storage element letter designations to indicate the shift register section in which a particular element is located. The magnetic coating 21 on each wire core 20 exists at least on the core portion which is within the solenoid winding 22 thereof. However, this coating may also extend throughout the full length of all leads in the lattice network without adversely affecting operation of the storage unit.

Input signals are applied to input terminals 23 and 26 on the left-hand ends of two series leads 27 and 28 which extend through at least one section of the register. In the example of FIG. 3, the leads 27 and 28 extend through sections 1 and 2, and they are then cross-connected and continue as leads 27' and 28' to output terminals 29 and 30. In addition, parallel readout terminals 31 are provided at circuit nodes of the lattice network in each section and may be used for the parallel extraction of information from the register in a manner which will subsequently be described. Parallel readout may also be accomplished between the output nodes of any register section. The shift register output is also coupled through an isolation stage 32 back to the input of the register in order to recirculate information in the register, but the operation of the invention does not depend upon such recirculation. Stage 32 may, for example, be a transformer with unity turns ratio for coupling pulse signals and blocking direct currents.

Turning now to the operation of the circuit of FIG. 3, it is assumed that a ONE has been written into section 1 of the register as indicated by positive signs at the right-hand terminal of the winding of each storage element. This condition may be established, for example, by means of a two-phase write-in signal applied at input terminals 23 and 26 in the same manner that information is shifted from one register section to another as will be described. Sections 2 and 4 are in the clear state with shift current in their solenoids to magnetize the elements in the hard direction. The remaining section 3 of the shift register is assumed initially to be in the ZERO condition as indicated by the positive signs at the left-hand terminals of its solenoid windings.

The basic operation involved in shifting information from one section to the next in the register of FIG. 3 is to drive certain elements of the one section to the hard direction of magnetization for generating a current and simultaneously to release certain elements of the next section to be tipped by such current. Shift currents are applied to solenoid windings of a wire pair connected to an output terminal of one shift register section to drive the magnetic coatings of that wire pair to the hard direction of magnetization. Simultaneously shift current fields are removed from the windings of a wire pair connected to an input terminal of the next succeeding lattice section so that currents generated in the preceding section may tip the magnetization of the released elements into a direction which is indicative of the polarity of previous easy magnetization in the driving section. The solenoid winding shift currents may be obtained from shift circuits such as those illustrated in FIG. 4 which will be described.

Figure 4:
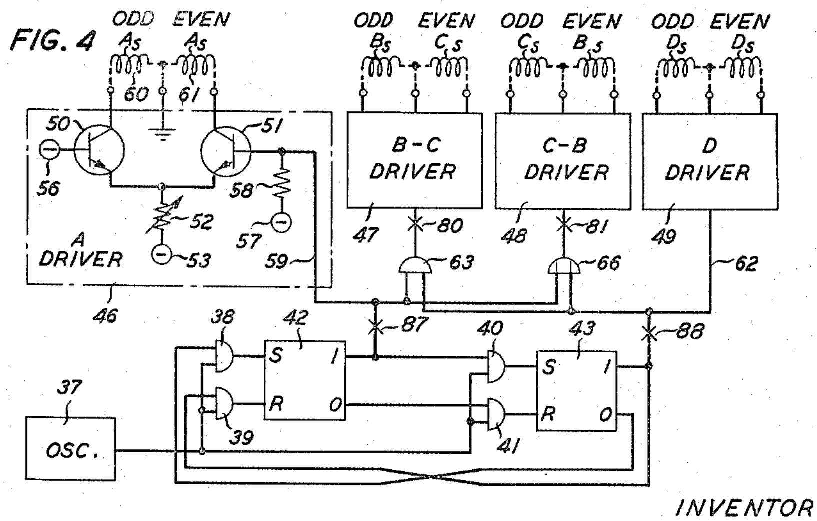
FIG. 4 is a simplified schematic diagram of shift circuits employed in connection with the operation of the circuit in FIG. 3.
Figure 5:
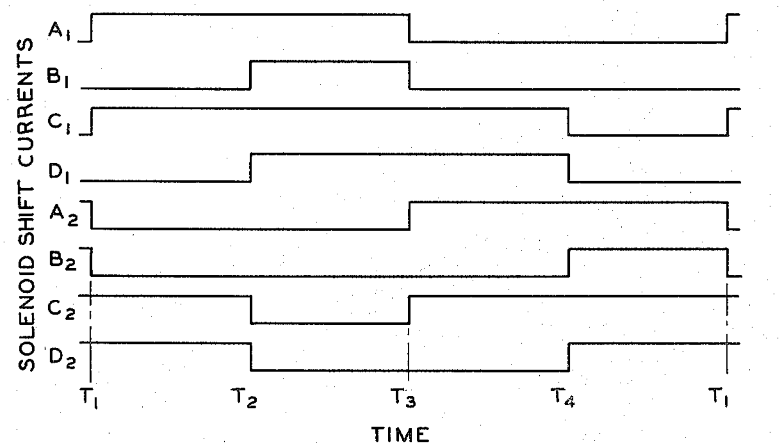
FIGS. 5 and 6 are wave diagrams illustrating the operation of the circuits in FIGS. 3 and 4.

The circuits of FIG. 4 produce output shift currents for all solenoid windings, and FIG. 5 illustrates shift current waveforms for sections 1 and 2 of the shift register. In FIG. 5 each shift signal has two amplitudes with the higher amplitude representing a shift signal which rotates magnetic domains into the hard direction of magnetization and the lower amplitude representing the shift signal which permits relaxation to the easy direction.

The first step of the shift operation involves the application of shift current at time $T_1$ to the solenoids of elements $A_1$ and $C_1$ to drive current into node *w* and from there into section 2 where the current generates fields in the coatings of element $A_2$ and $B_2$. These fields tip the magnetization of elements $A_2$ and $B_2$ which are at that time relaxing into their easy direction of magnetization. Elements $A_2$ and $B_2$ are now set in the ONE condition by the tipping fields so that a voltage of a polarity which is the same as that indicated for section 1 in the drawing will be generated when the elements are later driven to the hard direction of magnetization.

The next shift operation is the application of shift signals at time $T_2$ to elements $B_1$ and $D_1$ at the same time that shift signals are removed from segments $C_2$ and $D_2$. This time the induced voltage in driving section 1 produces a current which flows into node *x* and from there into driven section 2 where it generates magnetic fields which tip segments $C_2$ and $D_2$ to the ONE condition. Section 1 is now clear with all of its wire segment storage elements held in their hard direction of magnetization ready to receive a new bit of information. The ONE that was in section 1 is now stored in section 2.

It should be noted here that drive current from the lattice of section 1 does not flow beyond the driven section 2. The reason is that the balanced nature of the bridge lattice configuration causes potentials to be developed at the nodes *y* and *z* which are at substantially the same level so that no drive signal is coupled to section 3. Similarly, return currents from section 2 back to section 1 develop equal potentials at nodes *u* and *v* so that there is no reverse propagation of the information which had been stored in section 1.

Another advantage is offered by the lattice circuits. Return currents appearing at a node common to driving and driven sections, e.g., sections 1 and 2, are split in the driving section 1 between two storage elements which are resting in their easy magnetization condition. The effect of such return current is thereby considerably reduced insofar as the resting storage elements in the driving section are concerned. Furthermore, the only possible effect of the return current would be to change the polarity of easy magnetization in a resting element, but resting elements are not readily switched from one easy magnetization polarity to the other. Accordingly, there is practically no danger of spurious switching in section 1.

Similarly, drive currents applied to section 2 can tip the magnetic domains in only those storage elements where the shift current is being removed. Drive currents are insufficient to affect other segments where shift current holds the domains in their hard direction of magnetization.

In the next phase of shift register operation the ONE is shifted from section 2 to section 3 in the time interval $T_3$, $T_4$, $T_1$; and new information is written into section 1 from any suitable write-in circuits, not shown. These operations take place in much the same fashion just described for shifting the ONE from section 1 to section 2.

During the shift from section 2 to section 3 a pair of leads 33 and 36 cross couple the drive currents from node *y* to node *v'* and from node *z* to node *u'*. This cross connection, which is not essential to the basic operation of the invention, is included to illustrate one manner in which binary information in the shift register may be inverted, i.e., complemented. Thus, after time $T_3$ drive current from node *y* flows to node *v'* and from there through element $C_3$ and $D_3$ which are still held in their hard direction of magnetization by shift current. After elements $C_3$ and $D_3$, the drive current flows through elements $A_3$ and $B_3$ wherein the shift current is being removed. The drive current thus flows through the latter elements in the reverse direction with respect to the direction in which it flowed in corresponding elements of section 2 during the shift from section 1 to section 2. Accordingly, the magnetic coatings of elements $A_3$ and $B_3$ are tipped to the easy magnetization polarity which is opposite to that which had just previously prevailed in elements $A_2$ and $C_2$. Elements $A_3$ and $B_3$ are now in the ZERO condition. In a similar manner the drive current in the next phase of operation flows from node *z* to node $u'$ to tip segments $C_3$ and $D_3$ to the ZERO condition of easy magnetization. Thus, the ONE that had been in section 2 is transferred into section 3 in its complementary form, i.e., a ZERO. During the next two phases of the shift operation the ZERO in section 3 is shifted into section 4, and section 3 is left in its clear condition ready to receive new information.

FIG. 4 shows an illustrative embodiment of circuits that may be employed for supplying the four-phase shift signals which are utilized to energize the various solenoid windings A through D in each lattice network of the shift register in FIG. 3. An oscillator 37 supplies cyclically recurring pulses to four logical AND gates 38 through 41 in the set and reset input circuits for two flip-flop circuits 42 and 43. The AND gates may be of any well-known type which produces an output signal in response to the coincidence of signals at their two input connections. Flip-flop circuits 42 and 43 are also conventional in form and may, for example, be well-known bistable multivibrators.

The ONE and ZERO outputs of flip-flop circuit 42 are applied to the set and reset inputs of flip-flop 43 by AND gates 40 and 41. The ONE and ZERO outputs of flip-flop 43 are, however, applied to the reset and set inputs of flip-flop 42 by AND gates 38 and 39. The inversion of feedback connections from flip-flop 43 to the input connections of flip-flop 42 causes the flip-flops to be triggered alternately so that any one output of each flip-flop includes voltage transitions at a frequency which is one-half of the oscillator frequency, and the two flip-flops are out of phase by a time interval that is equal to the period of the oscillator.

Four solenoid driver circuits 46 through 49 receive output signals from flip-flop circuits 42 and 43 and generate the shift signals illustrated in FIG. 5. The A driver 46 is illustrated in detail and the other driver circuits are of similar configuration. Within each driver circuit two transistors, 50 and 51, are arranged in a common emitter differential amplifying type of circuit. Emitter electrodes of the two transistors are connected together and are also connected through a variable resistor 52 to a source 53 of negative potential which is schematically represented by a circled minus sign. In accordance with the usual convention, sources shown in this manner also are considered to include a ground return terminal.

Another source 56 of negative potential is connected to the base electrode of transistor 50, and a third source 57 is connected through a resistor 58 to the base electrode of transistor 51. Sources 56 and 57 have the same terminal potential, and this potential is typically less than the terminal potential of source 53. Thus, transistor 50 is normally nonconducting, and transistor 51 is normally conducting in the absence of additional input signals. The collector electrode of transistor 50 is connected to ground through a solenoid 60 which is the schematic representation of all A solenoid windings of alternate, e.g., odd numbered, shift register sections connected in series. The collector electrode of transistor 51 is similarly connected to ground through solenoid 61 which represent schematically the series-connected solenoid windings of all B storage elements of intermediate, e.g., even numbered, sections. Driver 49 controls solenoids of elements D in a similar manner. Drivers 47 and 48 are also similar to driver 46, but it has been found to be convenient for the B-C driver 47 to control the odd B solenoids and the even C solenoids while the C-B driver 48 controls the odd C and even B solenoids.

A lead 59 conects the ONE output of flip-flop 42 to the base electrode of transistor 51. When flip-flop 42 is in the ONE condition a positive potential is applied on lead 59 to the base of transistor 51 for biasing this transistor into conduction. Since transistor 51 was assumed initially conducting no change takes place yet. When flip-flop 42 transfers to the ZERO condition the resulting negative signal biases transistor 51 OFF and permits transistor 50 to begin conduction. The latter action takes place at time $T_1$ in FIG. 5. All current for transistor 50 must necessarily be taken from transistor 51, and the latter transistor is thus driven harder into the nonconducting condition. Upon the return of flip-flop circuit 42 to the ONE condition, transistors 50 and 51 are restored to their original states of conductivity. When transistor 50 is conducting the A solenoid windings 60 of all odd numbered sections in the shift register of FIG. 3 are energized, and when transistor 51 is conducting the A solenoids 61 of all even numbered sections of the shift register are energized.

A lead 62 connects the ONE output of flip-flop 43 for actuating the D driver 49 to energize alternately the D solenoid windings of odd and even sections of the shift register. It may be seen by reference to FIG. 5 that within a particular section of the shift register the A and D solenoids are energized for two time slots and are de-energized for the following two time slots, but the operations of such solenoids are displaced with respect to one another by a single time slot.

B-C driver 47 is operated by signals coupled from leads 59 and 62 through an AND gate 63. Thus, the B-C driver receives an input signal from gate 63 during the single time slots in each operating cycle of flip-flops 42 and 43 when both the A and the D drivers are also receiving input signals. This time slot is the interval between times $T_2$ and $T_3$ in FIG. 5. In a similar manner the C-B driver 48 receives input signals from lead 59 or lead 62 through an OR gate 66 during each of the three time slots in an operating cycle when at least one of the A or D drivers is receiving an input signal. The C-B driver receives no input signal during the single time slot when neither the A nor the D driver is receiving an input signal. Each of the drivers 46 through 49 alternately energizes its two sets of solenoid windings of the odd and even numbered sections of the shift register.

It has been found in drivers of the type described that the transfer of conduction from one transistor to the other takes place in a substantially linear manner. Resistor 52 may be adjusted to change the current amplitude in the solenoid windings and thus control the current amplitude at which the decreasing current in one transistor during a transfer of conduction is equal to the increasing current in the other transistor. This adjustment has been found to have an optimum value when the driver circuits are employed to energize solenoid windings in a shift register of the type illustrated in FIG. 3. Thus, it has been found that when a magnetic element of the type illustrated, for example, in FIGS. 1 and 2 is shifted back and forth between its hard and easy directions of magnetization, there is a small range of increasing shift current $I_D$ wherein the induced voltage and the resulting current reach peak values and the most efficient shifting into the hard direction of magnetization takes place. Similarly, there is a small range of decreasing shift current wherein the magnetic element is much more receptive to tipping signals than it is during other ranges. By adjusting resistor 52 to an optimum value such that there is a substantial time coincidence of the most efficient transfer range of the driving elements with the most efficient tipping range of the driven elements, an efficient mode of operation is realized wherein the shift register is even more immune to noise interference than uusal.

Before considering examples of some possible variations in the drive circuits of FIG. 4 it is convenient to note in FIG. 6 the output voltages which are produced between lattice output nodes $w$ and $x$ in FIG. 3 on the two drive phases when elements $A_1$ and $C_1$ are driven to the hard direction of magnetization in one phase of operation and subsequently elements $B_1$ and $D_1$ are driven into hard magnetization. This operation produces a narrow positive pulse just after time $T_1$ and a narrow negative pulse just after time $T_2$. These two narrow pulses are spaced apart by almost the full time slot interval between output voltage transitions from the shift circuits of FIG. 4.

Figure 6:
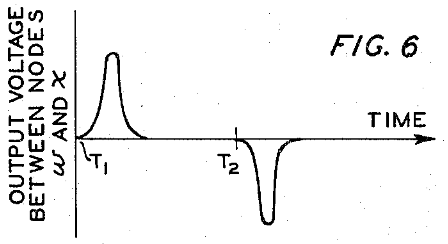

The output wave in FIG. 6 is typical of shift registers of the type described herein operating at approximately 125 kilocycles per second. It is apparent that if one desires to operate the shift register at a much faster rate it is necessary only to make suitable modifications in the operating frequency of the drive circuits of FIG. 4 so that the pulses are brought closer together. By utilizing this technique of speeding up the shift circuits, the register of FIG. 3 has been operated well into the megacycle range.

Figure 7:
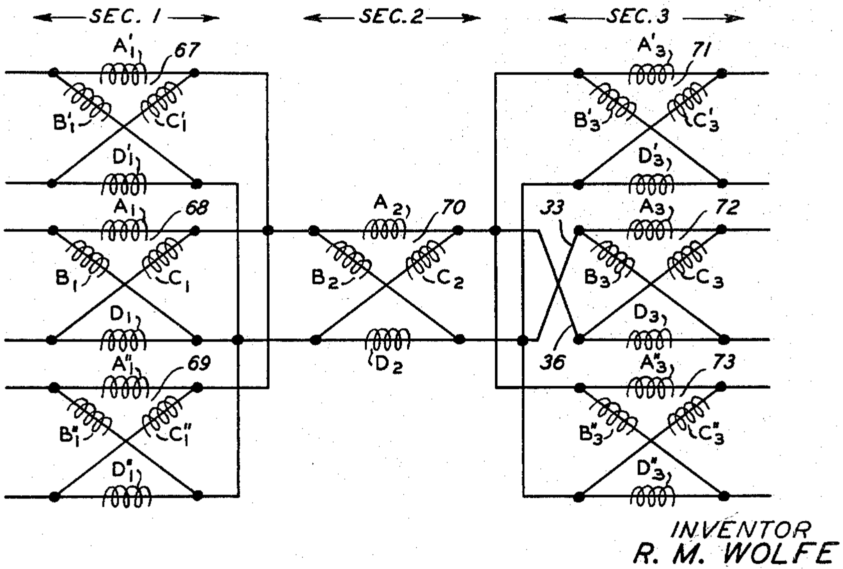
FIG. 7 is a modification of the circuit of FIG. 3.

In FIG. 7 there is shown an illustration of an arrangement for fan-in and fan-out that may be employed with magnetic storage elements in accordance with the invention. Section 1 comprises three magnetic storage circuits 67, 68, and 69 in the lattice configuration described in connection with FIG. 3. These circuits may receive input signals from any desired separate sources, not shown, and have their output connections applied in multiple to the input of another lattice network 70 which comprises section 2. The response of section 2 in FIG. 7 would be very similar to that of section 2 in FIG. 3, but in this case the network 70 would respond to the net input signal from networks 67 through 69. Thus, network 70 may be said to be responsive to a majority vote of the individual outputs from circuits which are connected in multiple to the input of network 70. No cross-talk takes place among the input signal sources for networks 67 through 69 as a result of their multiple connected outputs because each of the lattice networks is a balanced bridge circuit, and a signal applied in the nature of crosstalk at the output connection of one of the networks 67 through 69 is unable to develop a corresponding signal at the input terminals of the same network.

The output from section 2, network 70, is fanned out to three further lattice networks 71, 72, and 73 which comprise section 3 of the circuit in FIG. 7. Networks 71 through 73 have their inputs connected in multiple to the output of network 70 so that each is responsive to the output of the latter network. Network 72 is provided with cross coupling input leads 33 and 36 so that it receives the complement of information being shifted from network 70. No amplification is required between sections 2 and 3 because the output pulse generated by network 70 when two of its elements are driven to the hard direction of magnetization is relatively much larger than the tipping signal required to actuate any one of the elements in section 3. In one embodiment which was actually operated it was found that a lattice network such as the network 70 produces an output current pulse of approximately 12 to 14 milliamperes whereas only about 2 milliamperes of current are required to produce reliable tipping of a single magnetic element of the type shown in FIGS. 1 and 2. Thus, the output of network 70 in FIG. 7 can easily tip the six magnetic elements in networks 71 through 73 which must be operated during one phase of a shift operation. More than three output sections have been driven by a single input section without supplementary amplification.

Figure 8:
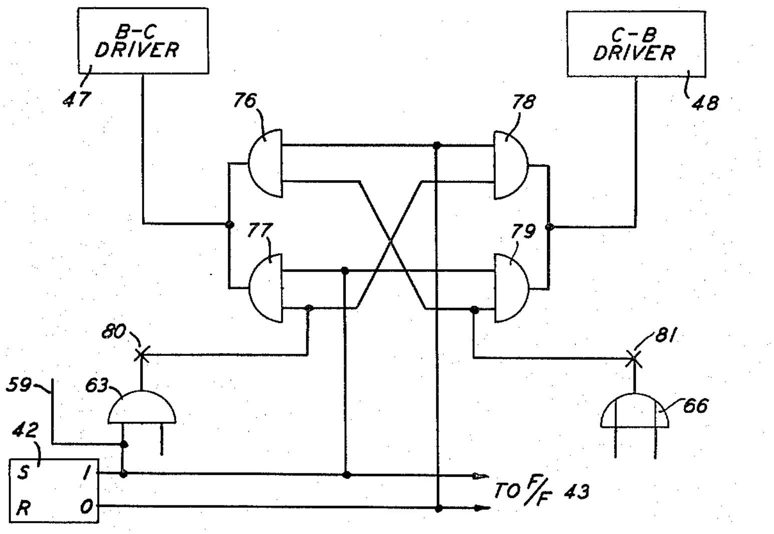
FIGS. 8 and 9 are modifications of the circuit of FIG. 4.

FIG. 8 shows a modification of the drive circuits of FIG. 4 which may be employed in connection with nondestructive parallel readout from the shift register of FIG. 3. For this purpose, information stored in odd numbered sections is shifted to even numbered sections, and parallel readout is accomplished from one or more of the elements A and D in each odd numered section. Next, by appropriate modification of the FIG. 4 shift circuits, the information in the even numbered sections is shifted in the reverse direction back into the original odd numbered sections. By working from the description of FIG. 3 the following table is constructed to compare operations to be performed in sections 1 and 2 for the forward and reverse shifting of information stored in section 2:

| | Shift Phase | Drive to Hard Direction | Release to Easy Direction |
|---|---|---|---|
| Forward shift | 1 | $A_2$, $C_2$ | $A_1$, $B_1$ |
| Readout section 2 to section 3 and write-in section 1 | 2 | $B_2$, $D_2$ | $C_1$, $D_1$ |
| Reverse shift | 1 | $A_2$, $B_2$ | $A_1$, $C_1$ |
| Write-in section 1 from section 2 | 2 | $C_2$, $D_2$ | $B_1$, $D_1$ |

The table shows clearly that reversal of shift may be accomplished by interchanging the phases in which B and C solenoids in each section are operated at the time that readout from even numbered sections is to be started. This is equivalent to interchanging the function of the B–C and C–B drivers, and the FIG. 8 circuits are adapted to do just that.

In FIG. 8 only modified connections between gates 63 and 66 and their drivers 47 and 48 are shown. All other shift circuit connections are the same as in FIG. 4. Logical AND gates 76 through 79 are provided to control the application of signals from gates 63 and 66 to drivers 47 and 48, respectively. Gates 76 and 77 control signals from circuit points 80 and 81 in the outputs of gates 63 and 66 to driver 47. Gates 78 and 79 similarly control signals from points 80 and 81 to driver 48. Enabling signals to gates 76 through 79 are provided by the ONE and ZERO outputs of flip-flop 42. The ONE output of flip-flop 42 is applied to gates 77 and 79 for enabling those gates to couple the outputs of gates 63 and 66 to drivers 47 and 48, respectively, for operation in the same manner previously described in connection with FIG. 4. However, the ZERO output of flip-flop 42 is applied to enable gates 76 and 78 when the flip-flop is reset for coupling the outputs of gates 63 and 66 to drivers 48 and 47, respectively.

The result of this switching at circuit points 80 and 81 in the outputs of gates 63 and 66 is to shift the phases of shift operation. Thus, for example, if a ONE is stored in section 1 of the shift register in FIG. 3, it is transferred during the first two shift phases to section 2 in a manner previously described. However, at the beginning of the third shift phase the connections at points 80 and 81 in FIG. 4 are switched by the circuits illustrated in FIG. 8 so that during shift phases 3 and 4 the ONE which was just shifted into section 2 is shifted back into section 1 instead of being shifted in the forward direction into section 3.

Output signals may be derived at parallel readout terminals 31 of FIG. 3 and are representative of the information stored in a particular section of the shift register when the information is shifted into the next succeeding section, and the same information may be restored thereafter during the reverse shift just described. No additional amplification is required for this parallel readout from the register since there is ample energy available for the reasons previously noted in connection with the description of the fan-out circuits in FIG. 7. If it were desired to employ parallel readout at only certain selected times, an additional control circuit of the type to be described in connection with FIG. 9 can be inserted in the enabling input connections to gates 76 through 79 to permit selection of such times.

Figure 9:
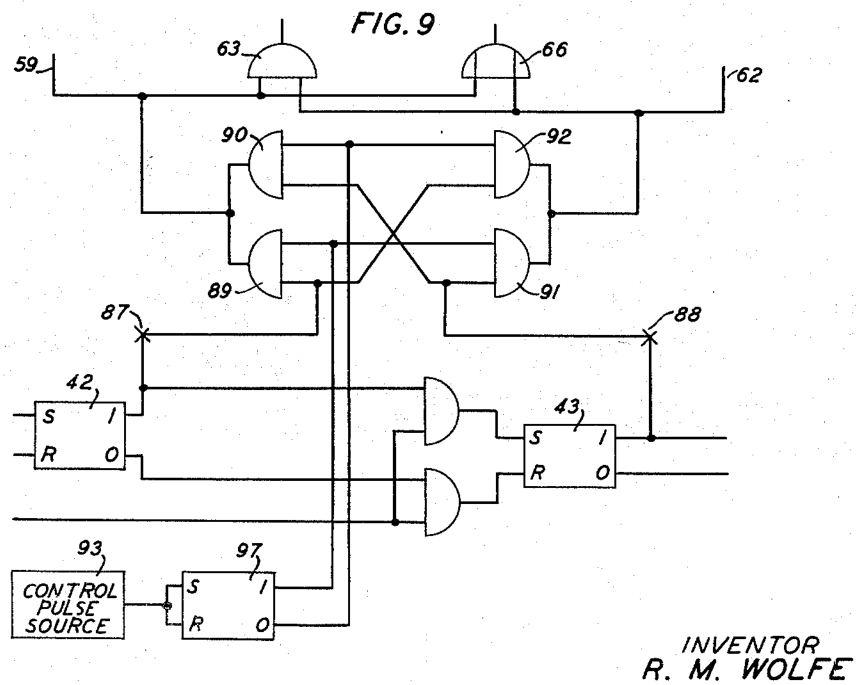

FIG. 9 illustrates a further modification of the drive circuits of FIG. 4 which may be utilized for inverting information which is shifted through the register of FIG. 3. It was previously explained in connection with leads 33 and 36 in FIG. 3 how signals can be inverted to produce the complement of binary information. In some situations it is convenient to be able to obtain the complement of an entire word in parallel by simultaneously inverting all bits in a word. FIG. 9 shows one way in which the circuits of FIG. 4 may be easily modified to accomplish the desired inversion. Here again only the modified portions of FIG. 4 are shown.

Recalling the previous discussion of inverting leads 33 and 36, the inversion is accomplished by reversing the phase sequence in which the wire pairs of a driven section in a shift register are permitted to relax to the easy condition of magnetization. In FIG. 3 the sequence reversal was accomplished by crossing leads between sections, but FIG. 9 shows an arrangement for actually switching the phases of certain shifts signals.

Four AND gates 89 and 92 are provided in FIG. 9 at circuit points 87 and 88 of FIG. 3 to control the application of signals from flip-flop circuits 42 and 43 to leads 59 and 62. A control pulse source 93 is arranged to apply a triggering voltage to the set and reset inputs of a flip-flop circuit 97. For example, source 93 may be the time base circuits in a computer system, and it provides pulses when complementing is desired.

In the set condition of flip-flop 97 a ONE output is applied to enable gates 89 and 91 for coupling the ONE outputs of flip-flops circuits 42 and 43 to leads 59 and 62, respectively, to produce operation in the manner originally described in connection with FIG. 4. However, a first output pulse from source 93 triggers flip-flop 97 to the reset condition thereby disabling gates 89 and 91 and enabling gates 90 and 92. Now leads 59 and 62 are connected to circuit points 88 and 87, respectively. If operation in the time interval from $T_1$ to $T_3$ in FIG. 5 is assumed when gates 90 and 92 are enabled, elements $C_2$ and $D_2$ are released at time $T_1$; and elements $A_2$ and $B_2$ are released at time $T_2$. This is the inverse of the order in which elements of a driven section are released in normal operation and produces inverted storage. A second pulse from source 93 at time $T_3$ restores the original circuit condition described in connection with FIG. 4, and the inverted information continues to pass through the register in the normal manner. The type of circuit represented by gates 89 through 92, source 93, and flip-flop 97 may also be used, as previously noted, to select times for supplying switching signals to gates 76 through 79 in FIG. 8.

Although the present invention has been described in connection with particular applications and embodiments thereof, it is to be understood that these are presented merely by way of illustration and that additional embodiments and applications, which will be obvious to those skilled in the art, are included in the spirit and scope of the invention.

What is claimed is:

1. A controllable magnetic storage unit comprising a wire,
   at least two anisotropic magnetic devices coupled to said wire, each of said devices having hard and easy axes of magnetization,
   means applying magnetic fields to said devices with magnitude and orientation appropriate for magnetizing such devices in said hard direction thereby generating voltages in said wire which are indicative of the previous condition of magnetization of each device, and
   said applying means including means removing the field from a first one of said devices at substantially the same time that the field is applied to a second one of said devices so that the voltage generated in said wire upon the application of the field to said second device produces a current in the wire which generates a magnetic field along said easy axis in said first device.

2. The storage unit in accordance with claim 1 in which said magnetic fields are of at least sufficient strength to magnetize said devices substantially completely in said hard direction.

3. The storage unit in accordance with claim 1 in which said field applying means comprises
   a different coil electromagnetically coupled to each of said devices,
   a multiphase current source supplying current to said coils in different phases, and
   means in said source for adjusting the magnitude of said current for substantial time coincidence during transfer between phases of the most efficient magnetic field switching ranges of said first and second devices.

4. In combination, a plurality of wires arranged in a lattice network having input and output terminals, a different pair of said wires being connected in said network to each of said output terminals,
   a coating of anisotropic magnetic material on at least a portion of each of said wires, said material having its easy direction of magnetization in the circumferential direction around the respective wires and having its hard direction of magnetization along the lengths of said wires, and
   means selectively applying to either of said wire pairs a magnetic field of sufficient strength to shift the magnetization of said coating thereon to the hard direction of magnetization.

5. In combination, plural segments of wire, a plurality of anisotropic magnetic elements each in electromagnetic coupling relation with a different one of said segments, each of said elements having a hard and an easy direction of magnetization,
   means connecting said segments in a lattice network, and
   means selectively applying magnetic fields to said elements for shifting the magnetization thereof between said easy and hard directions of magnetization.

6. In combination, a plurality of segments of wire, each of said segments having an electrical conductive core and an anisotropic magnetic coating thereon with easy and hard directions of magnetization,
   means connecting said segments in a lattice network,
   means applying current to said network for generating magnetic fields tending to rotate magnetic domains in said coatings to said easy direction of magnetization, and
   means applying a further magnetic field to selected ones of said segments for tending to rotate the magnetic domains thereon to said hard direction of said magnetization.

7. In a controllable magnetic storage unit, a plurality of wire segments having electrically conductive cores and anisotropic coatings thereon, said coatings being characterized by a hard direction of magnetization and by an easy direction of magnetization to which the magnetic domains of said coating relax in the absence of a magnetic field in said hard direction, a large magnetomotive force being required to switch the polarity of said domains in said easy direction or to rotate said domains from said easy direction to said hard direction, a small magnetomotive force being required for tipping said domains to a predetermined polarity of easy magnetization upon the removal of said large field with hard direction orientation,
   means connecting said wire segments in a lattice network,
   means selectively applying to said wire segments for predetermined time intervals a magnetomotive force for rotating magnetic domains therein to said hard direction of magnetization thereby inducing in the core of such segments a current with a polarity which is indicative of the polarity of the previous condition of easy magnetization, and
   means applying input signal currents to said lattice network with at least sufficient magnitude to generate said tipping magnetomotive force therein.

8. The controllable magnetic storage unit in accordance with claim 7 wherein said input signal applying means comprises a plurality of signal current supply sources connected in multiple to said network.

9. The controllable magnetic storage unit in accordance with claim 7 which comprises in addition a plurality of output circuits connected to receive current from said network.

10. The controllable magnetic storage unit in accordance with claim 9 wherein each of said output circuits comprises a further lattice network similar to the first-mentioned lattice network.

11. The controllable magnetic storage unit in accordance with claim 10 wherein at least one of said further networks is connected to receive current from said first-mentioned network for generating said tipping magnetomotive force with a tipping polarity which is the complement of the polarity of said previous condition in said first-mentioned network.

12. The storage unit in accordance with claim 7 in which said input signal currents are applied at substantially the same time that said selectively applied field is removed.

13. A shift register comprising an iterative lattice network wherein each lattice section comprises a plurality of wire segments each having an electrically conductive core and an exterior coating of an anisotropic magnetic material, said material having a hard direction of magnetization and an easy direction of magnetization, each of said sections also having first and second output pairs of the wire segments therein connected to first and second output terminals, respectively, and having the same wire segments in a different combination of input pairs connected to the input terminals of such section, respectively, means selectively applying to said segments for predetermined time intervals a magnetic field oriented in said hard direction, and said selective field applying means comprises means applying said field to an output pair of at least one of said sections substantially simultaneously with the removal of said field from an input pair of the next succeeding section in said shift register so that voltages induced in the cores of such output pair drive currents into such input pair of the succeeding section.

14. The shift register in accordance with claim 13 which comprises in addition direct current isolation means coupling the output of the last section of said register to the input of the first section thereof.

15. A reversible shift register comprising a plurality of wire segments each having an electrically conductive core and a coating thereon of an anisotropic magnetic material, said material being characterized by a hard, unstable axis of magnetization and an easy, stable axis of magnetization to which magnetic domains relax in the absence of an applied field in said hard direction, means connecting said wire segments in a plurality of cascade connected lattice networks, each of said networks having the segments thereof arranged in a first combination of two input wire pairs connected respectively to the section input terminals and arranged in a second combination of output wire pairs connected to the section output terminals, means applying to and removing from selected ones of said wire pairs a magnetomotive force of sufficient magnitude to shift magnetization in the coatings of such pairs between said easy and hard magnetization axes, said applying means comprising means selectively applying said force to one of said output pairs of alternate ones of said sections in said register and simultaneously removing such magnetomotive force from an input pair of the intermediate sections of said register for forward shifting in said register, and said applying means further comprises means reversing the application order of said force to said sections for applying said force to an input pair of said alternate sections while simultaneously removing said force from an output pair of said intermediate sections for reverse shifting.

16. A shift register comprising a plurality of wire segments having an electrically conductive core portion and a magnetic coating of anisotropic material thereon with hard and easy directions of magnetization for said material, means connecting said segments in a cascade of lattice networks each having a pair of input terminals and a pair of output terminals, the segments of each of said networks being arranged in a first combination of wire pairs connected to each of said output terminals and the same segments being arranged in a second combination of wire pairs connected to each of said input terminals, means applying to and removing from selected ones of said pairs a magnetic field adapted for shifting the magnetization of coatings of such pairs between said easy and hard directions, said applying means comprising first means applying said field to a first one of said first wire pairs in a first one of said lattice networks and simultaneously removing said field from a first one of said second pairs of a succeeding network, second means thereafter applying said field to a second one of said first pairs in said first network and simultaneously removing the field from a second one of said second pairs in said succeeding networks, and means changing the sequence of field removal of said first and second applying means from said second pairs to complement binary information shifted between said first and succeeding networks.

17. A shift register comprising a plurality of wires having electrically conductive core portions and anisotropic magnetic coating thereon with hard and easy directions of magnetization, means connecting said wires in a plurality of cascaded lattice networks, the wires of each of said networks being arranged in a first combination of input wire pairs connected to the network input terminals respectively, and in a second combination of output wire pairs connected to the network output terminals respectively, and a multi-phase drive circuit for applying magnetic fields to said wires in different phases and for similarly removing such fields, said fields being adapted to rotate magnetic domains in the wire coatings from the easy to the hard direction of magnetization, said drive circuits including means successively first applying such fields to a first of said output wire pairs in alternate ones of said lattice networks at the same time that similar fields are removed from a first one of said input wire pairs of the intermediate ones of said lattice networks and subsequently applying such fields to a second one of the output pairs of said alternate networks while simultaneously removing similar fields from the second input pair of the intermediate sections to shift stored information from said alternate sections to said intermediate sections, and means for switching the sequences of phases of operation of said drive circuits to control the nature of shifting in said register.

18. The shift register in accordance with claim 17 wherein said switching means comprises means reversing the sequence in which said fields are applied to, and removed from, the two wire pairs of each of said intermediate networks so that signals shifted into said intermediate networks are at the same time inverted in binary form.

19. The shift register in accordance with claim 17 in which said switching means comprises means interchanging drive phases for shunt branches of said intermediate lattice networks to reverse the direction of shift within said register.

20. The shift register in accordance with claim 17 in which said drive circuit comprises a source of oscillations,
first and second frequency dividing means connected to be driven by said source in different phases,
a first current driver having two output connections to which it supplies current one at a time,
means connecting said first driver to receive activating signals from the output of said first frequency dividing means for switching current between said two output connections in response to output voltage variations from such dividing means,
means coupling one of said two output connections to a first one of said wires in a series branch of alternate ones of said networks,
means coupling another of said two output connections to a corresponding first wire in intermediate ones of said networks,
a second current driver similar to said first driver and similarly connected to said second frequency dividing means and to a second one of said wires in a series branch in said alternate and intermediate networks,
third and fourth current drivers similar to said first driver,
means coupling said third and fourth drivers to shunt branches of said alternate and intermediate networks,
means actuating said third driver in response to the coincident application of actuating signals of a predetermined polarity to said first and second drivers, and
means actuating said fourth driver in response to the application of an actuating signal of said predetermined polarity to either of said first and second drivers.

21. In a controllable magnetic storage unit, a plurality of wire segments having electrically conductive cores and anisotropic coatings thereon, said coatings being characterized by a hard direction of magnetization and by an easy direction of magnetization to which the magnetic domains of said coatings relax in the absence of a magnetic field in said hard direction, a large magnetomotive force being required to switch the polarity of said domains in said easy direction or to rotate said domains from said easy direction to said hard direction, a small magnetomotive force being required for tipping said domains to a predetermined polarity of easy magnetization upon the removal of said large field with hard direction orientation, means connecting said segments in a plurality of tandem lattice networks,
means selectively applying to said wire segments for predetermined time intervals a magnetomotive force for rotating magnetic domains therein to said hard direction of magnetization thereby inducing in the core of such segments a current with a polarity which is indicative of the polarity of the previous condition of easy magnetization, and
means applying said current from at least one of said networks to a succeeding one of said networks for generating in the latter network a tipping field which is indicative of the complement of said previous condition.

References Cited by the Examiner

UNITED STATES PATENTS

| | | | |
|---|---|---|---|
| 2,945,217 | 7/60 | Fisher et al. | 340—179 |
| 3,042,997 | 7/62 | Anderson et al. | 340—174 |

IRVING L. SRAGOW, *Primary Examiner.*